Sept. 13, 1938.　　　E. ERICKSON　　　2,129,916
FISHLINE DRYING REEL
Filed Sept. 5, 1936　　　2 Sheets-Sheet 1

INVENTOR
Erhart Erickson
By his Attorneys
Merchant Kilgore

Sept. 13, 1938.  E. ERICKSON  2,129,916
FISHLINE DRYING REEL
Filed Sept. 5, 1936  2 Sheets—Sheet 2

INVENTOR
Erhart Erickson
By his Attorneys
Merchant & Gilmore

Patented Sept. 13, 1938

2,129,916

UNITED STATES PATENT OFFICE 2,129,916

FISHLINE DRYING REEL

Erhart Erickson, Minneapolis, Minn.

Application September 5, 1936, Serial No. 99,541

1 Claim. (Cl. 242—104)

My invention provides an extremely simple and highly efficient line drying reel, especially adapted to use as a fish line drying reel; and generally stated, the invention consists of the novel devices, combinations of devices and arrangement of parts hereinafter described and defined in the claim.

It is, of course, well-known that the drying of fish lines after use is highly important to prevent rotting of the lines. This is frequently accomplished by winding the line around various objects, such as chairs, or between outdoor objects that may be found available. The objections to such methods of drying are obviously too well-known for the comment.

My invention has for its object, and provides a small compact device, onto which the fish line may be readily wound, directly off from the fishing reel, and from which drying reel the line, when dried, may be rapidly wound back onto the fishing reel. The device hereinafter more specifically described has all the desirable features of a drying reel. It involves a multiplicity, that is two or more, concentric, rotatively mounted squirrel cage reels, onto which the line may be wound, progressively, first onto the innermost and then onto the outermost reel.

In the drawings I have shown the invention as involving two concentric squirrel cage reels; but the number of reels may be increased. By a "squirrel cage" reel is meant a reel that has circumferentially spaced longitudinally extended bars that form a sort of skeleton or open cylindrical or tubular structure, which will leave the major portion of the line freely exposed to the air.

The invention is illustrated in the accompanying drawings, wherein like characters indicate like parts throughout the several views.

Referring to the drawings.

Figure 1:
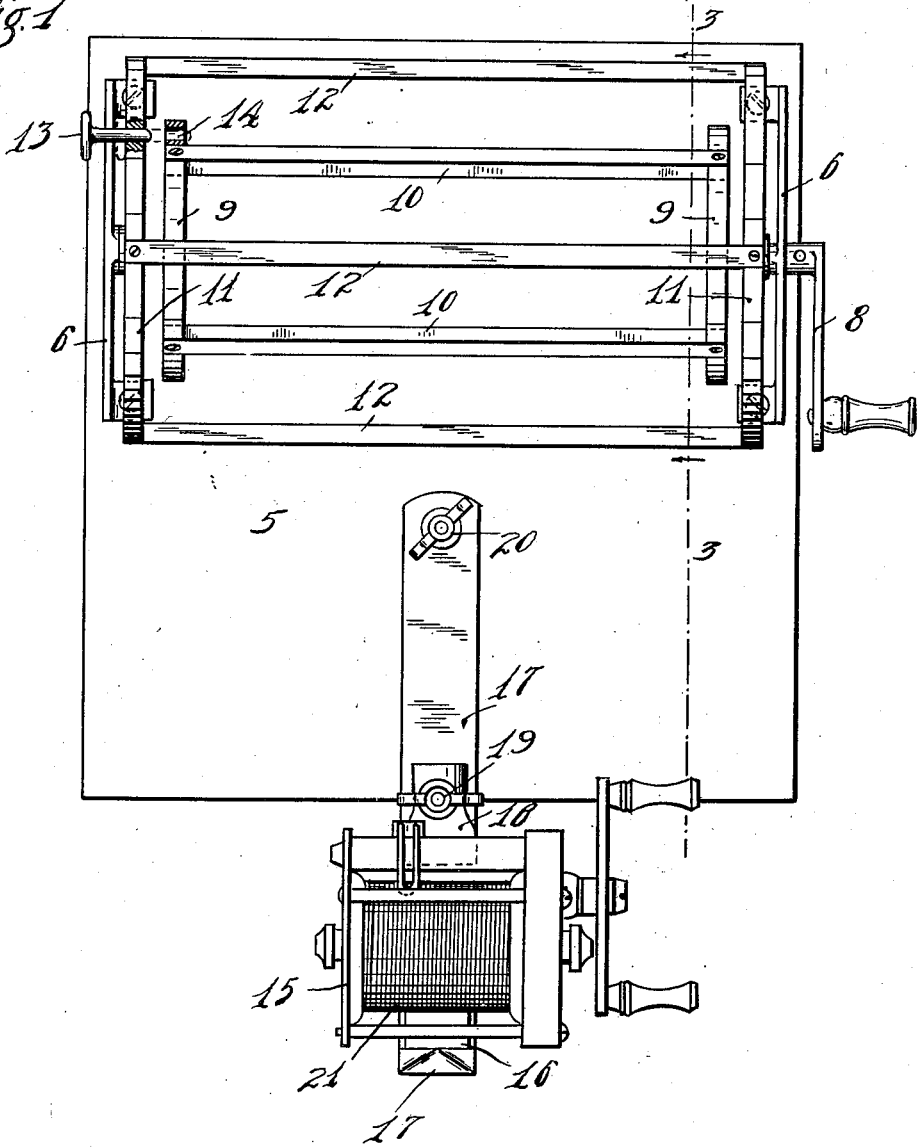
Fig. 1 is a plan view showing the complete device.

As preferably designed, the concentric squirrel cage reels and means for supporting a fishing reel are mounted on a common base. This base, as shown, is a flat board or plate 5 having laterally spaced upstanding bearing brackets 6 in the upper portions of which is journaled a transverse shaft 7 having an operating crank 8 at one end. The inner squirrel cage reel is mounted on and secured to the shaft 7, while the outer squirrel cage reel is normally loose on said shaft. The inner squirrel cage reel is made up of heads 9 connected by circumferentially spaced longitudinal bars 10; and the outer reel is made up of heads 11 and circumferentially spaced longitudinally extended bars 12. The heads 9 will be fixed to the shaft 7 for rotation therewith while the heads 11 will be normally loose on said shaft. By suitable means, the two reels can be locked for common rotation with the shaft 7; and as shown, this is accomplished by a pin 13 that is insertable through coincident holes in one of the heads 11 and into an aligned hole 14 in the adjacent head 9, see Fig. 1. When pin 13 is pulled out, as shown by full lines in Fig. 1, it will engage the adjacent bracket 6 and positively prevent rotation of the larger or outer reel; but when moved to the position shown by dotted lines in said view, it will lock the two reels for common rotation and its head will then clear the bracket 6.

The numeral 15 indicates an ordinary fishing reel. The pole-engaging base 16 of which is adapted to be detachably clamped to an arm 17 that is mounted for lateral movements in respect to the drying reel. As shown, the reel base 16 is detachably secured to the arm 17 by clip 18 that is secured to the arm 17 by a nut-equipped bolt 19. The inner end of the arm 17 is shown as pivotally secured to the base 5 by a nut-equipped bolt 20. The numeral 21 indicates the fish line.

Figure 2:
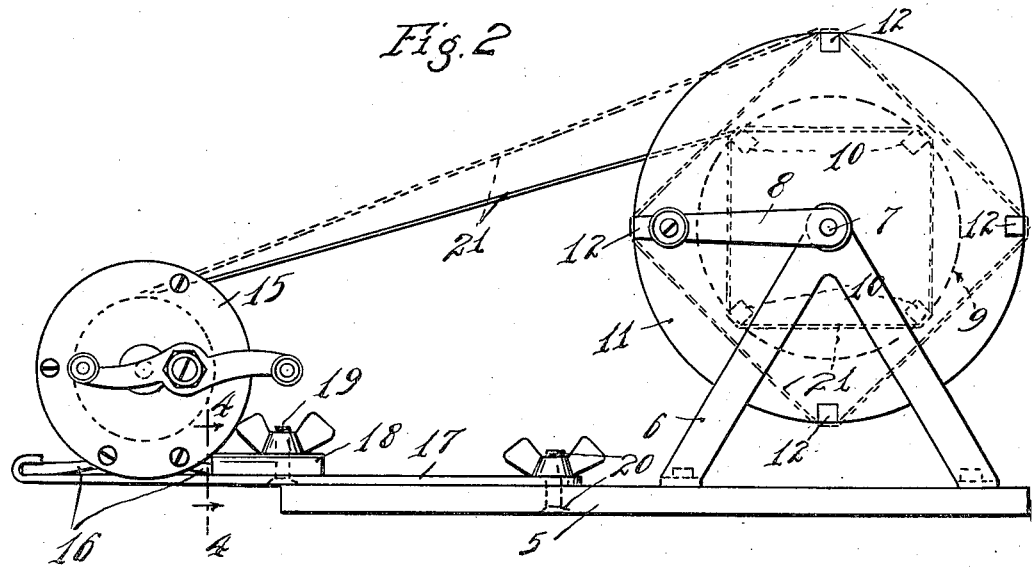
Fig. 2 is a side elevation of the parts shown in Fig. 1.
Figure 4:
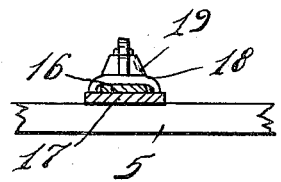
Fig. 4 is a fragmentary section taken on the line 4—4 of Fig. 2.
Figure 3:
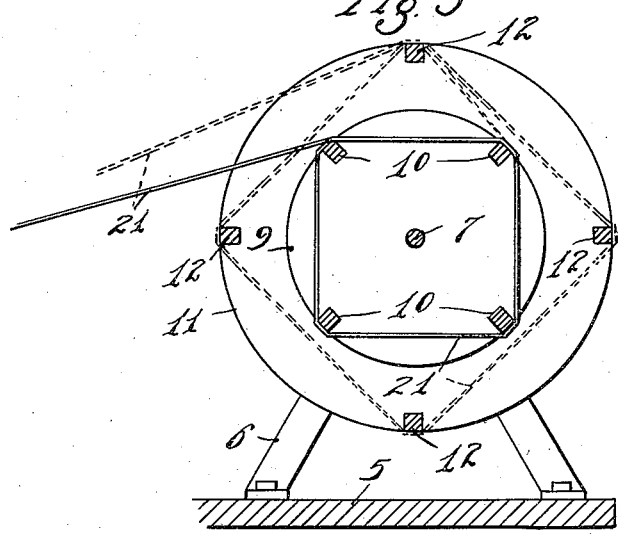
Fig. 3 is a section taken on the line 3—3 of Fig. 1.

The operation of the device is probably obvious from the foregoing description, but may be briefly summarized as follows: When the fishing reel 15 is supported, as shown in Figs. 1 and 2, and the wet fish line 21 is drawn therefrom and attached to one of the bars 10 of the inner squirrel cage reel, and when the said inner reel is rotated, the line will be unwound from the fishing reel and wound upon the said inner reel. Under this initial operation, the outer reel, which is loose on the shaft 7, will remain stationary or non-rotary, being held from such rotation by the tension on the line which is then being drawn between the bars 12. By oscillation of the arm 17, the line from the fishing reel may be directed onto the inner reel with a sort of spiral wind, and thereby spread out evenly on the said inner reel.

When a large portion of the fish line, say about one-half thereof, has been wound upon the said inner reel, the pin 13 will then be inserted into the perforation 14, thereby locking the outer reel for common rotation with the inner reel and shaft 7. When the two reels are thus locked for common rotation, the line will then be wound solely on the outer reel.

When the line has been thoroughly dried, it can be wound back onto the fishing reel by a reverse operation, that is by first unwinding the cable from the outer reel, then unlocking the outer reel from the inner reel so as to permit the inner reel to continue to rotate while the outer reel remains stationary.

The improved drying device described has been found highly efficient as a fish line drying device, but, of course, it will be understood that it may be made in various sizes for the drying of various different kinds of lines. Also, it will be understood that the device described is capable of various modifications within the scope of the invention herein disclosed and claimed.

What I claim is:

In a device of the kind described, the combination with a supporting base having upstanding laterally-spaced brackets and means for supporting a fishing reel, of a crank-equipped shaft journaled in said brackets, concentric squirrel-cage drying reels mounted on said shaft, the inner and smaller reel being rigidly secured to said shaft and the outer reel being normally loose on said shaft, and a lock pin insertable through perforations in adjacent heads of the two reels to lock the same for common rotation, said lock pin being of such length and so related to the adjacent bracket that when inserted to lock the two reels for common rotation, it will clear said bracket, but when withdrawn from the head of the inner reel will engage said bracket and lock said outer reel against rotation.

ERHART ERICKSON.